(12) United States Patent
Costa et al.

(10) Patent No.: US 7,280,516 B1
(45) Date of Patent: Oct. 9, 2007

(54) CORE NETWORK ALLOCATION FOR GSM/UMTS

(75) Inventors: Mauro Costa, Pavia (IT); Sudeep Kumar Palat, Grange Park (GB); Michael Roberts, Southend-on-Sea (GB); Sutha Sivagnanasundaram, London (GB)

(73) Assignee: Lucent Technologies Inc., Murray Hill, NJ (US)

( * ) Notice: Subject to any disclaimer, the term of this patent is extended or adjusted under 35 U.S.C. 154(b) by 1001 days.

(21) Appl. No.: 10/069,360

(22) PCT Filed: Jun. 20, 2000

(86) PCT No.: PCT/EP00/05706

§ 371 (c)(1),
(2), (4) Date: Feb. 19, 2002

(87) PCT Pub. No.: WO01/15470

PCT Pub. Date: Mar. 1, 2001

(30) Foreign Application Priority Data

Aug. 20, 1999 (GB) .................................. 9919851

(51) Int. Cl.
*H04Q 7/24* (2006.01)
*H04Q 7/20* (2006.01)

(52) U.S. Cl. .................. 370/338; 370/329; 455/435.2; 455/450

(58) Field of Classification Search ................ 370/328, 370/338, 465–467, 329; 455/436, 450, 509
See application file for complete search history.

(56) References Cited

U.S. PATENT DOCUMENTS

| 6,181,940 | B1 * | 1/2001 | Rune .................... 455/435.2 |
| 6,339,705 | B1 * | 1/2002 | Pehrson .................... 455/419 |
| 6,374,112 | B1 * | 4/2002 | Widegren et al. ........ 455/452.2 |
| 6,397,065 | B1 * | 5/2002 | Huusko et al. .......... 455/435.2 |
| 6,574,473 | B2 * | 6/2003 | Rinne et al. ............... 455/436 |

FOREIGN PATENT DOCUMENTS

WO  WO99/01991  1/1999

OTHER PUBLICATIONS

XP-000740416 "Research Activities on UMTS Radio Interface, Network Architectures, and Planning" (Ermanno Berruto et al., CSELT) IEEE Communication Magazine, Feb. 1998, pp. 87-88.*
Research Activities on UMTS Radio Interface, Network Arcitectures and Planning by E. Berruto 1998 IEEE.

* cited by examiner

*Primary Examiner*—Afsar Qureshi

(57) ABSTRACT

A packet switched network architecture comprising a location area connected by a radio access network to at least two core networks having different functionality, wherein the radio access network switches packet transmissions from each terminal in the location area to one of the at least two core networks.

3 Claims, 4 Drawing Sheets

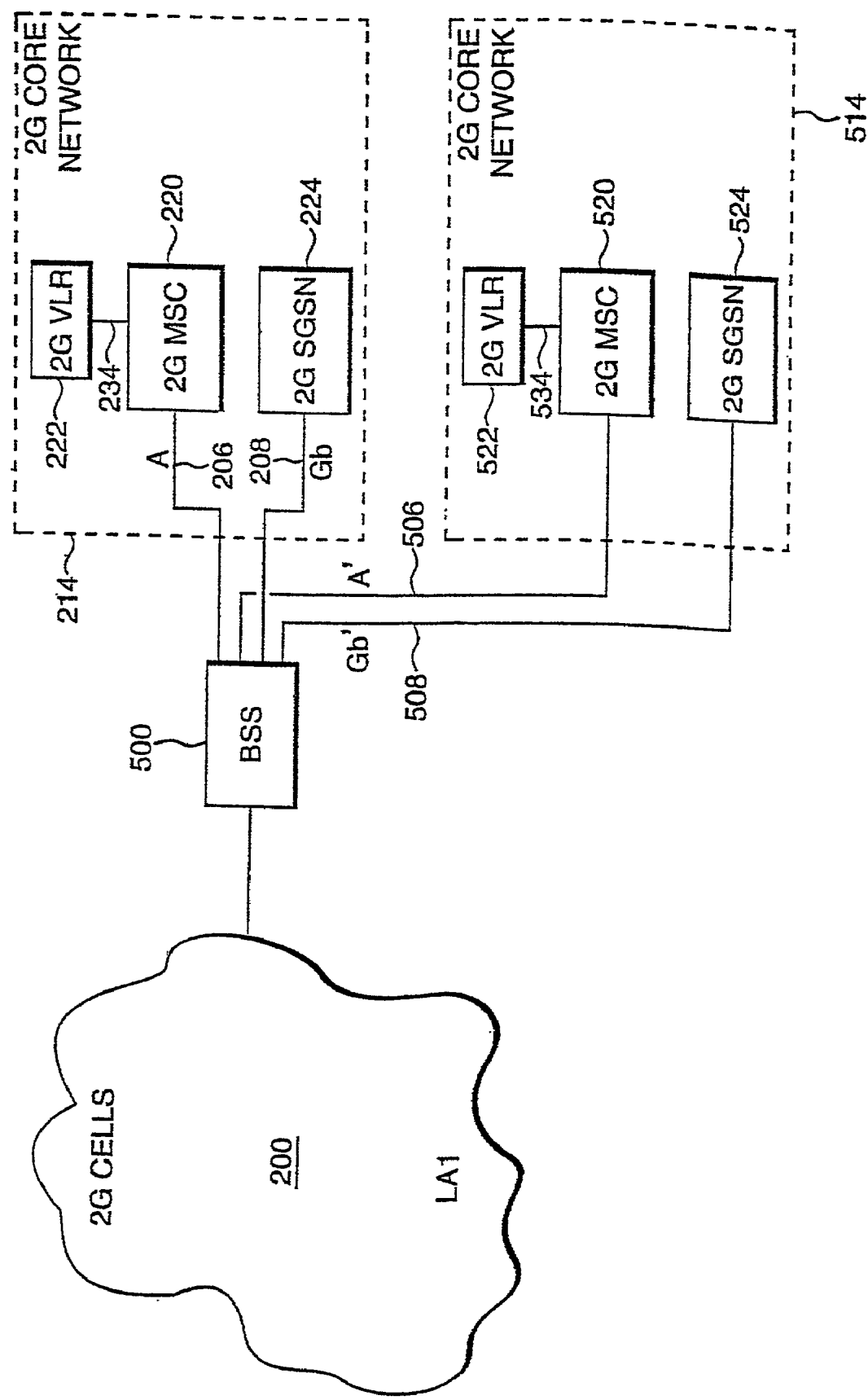

CORE NETWORK ALLOCATION FOR GSM/UMTS

FIELD OF THE INVENTION

The present invention relates to an improved network architecture for an arrangement in which mobile terminals may have at least two functional modes of operation in which the functional modes are provided by at least two core networks having different functionality. The invention is particularly but not exclusively related to the introduction of 3G services into a 2G network architecture.

BACKGROUND TO THE INVENTION

GSM (Global System for Mobile Communications) radio coverage, which may also be referred to as second generation (2G) radio coverage, is quite extensive today. During the introduction of UMTS (Universal System for Mobile Telecommunications), which may also be referred to as third generation (3G) radio coverage, UMTS radio coverage is expected to be limited to urban areas. Thus UMTS radio coverage will cover only parts of the more extensive GSM radio coverage areas. Even within UMTS coverage areas, the UMTS radio coverage cannot be expected to be contiguous. For example, given that the frequency used for UMTS is higher than that for GSM, the in-building penetration will not be as good as GSM. This will result in small pockets (such as inside buildings) without UMTS coverage within the overall UMTS coverage area. Thus, only GSM radio coverage will be available in these pockets.

A dual mode GSM and UMTS mobile terminal (a mobile terminal is referred to as user equipment (UE) in UMTS) can communicate using either one of the two radio access systems. If a dual mode mobile terminal communicating via the UMTS radio link goes out of UMTS coverage, to an area with only GSM coverage, it can expect to continue the communication via the GSM radio link, but with a consequential degradation of service. Similarly a dual mode mobile terminal in an area with only GSM radio coverage which moves into an area with UMTS coverage can expect to switch to the UMTS radio link to improve service.

Thus as a dual mode mobile terminal moves around within radio access areas, changes in the type of radio access can be expected as the available radio access systems change. As the mobile terminal moves between radio access areas routing area updates occur to notify the necessary support network of the new position of the mobile in the routing area associated with the particular radio access type. Changing between two radio access systems involves additional signalling and can also lead to outages during the transition between the two systems. The impact of the additional signalling and outages depends on the network architecture and the protocols chosen.

In addition, if a mobile terminal operating in the 3G mode of operation moves out of 3G coverage, then there is a consequential degradation in service when communication with the 2G core network is established.

It is an object of the present invention to provide an improved network architecture suitable for an architecture in which at least two functional modes of operation exist.

The paper by Schieder A Et Al entitled 'Gran—A New Concept for Wireless Access in UMTS' ISS. World Telecommunications Congress. (International Switching Symposium), CA, Toronto, Pinnacle Group, 21 Sep. 1997 (1997-09-21), pages 339-345, discloses a packet switched network architecture comprising a location area connected by a radio access network to at least two core networks having different functionality, wherein the radio access network switches packet transmissions from each terminal in the location area to one of the at least two core networks.

SUMMARY OF THE INVENTION

The present invention is characterised over the disclosure of the Scheider paper mentioned above in that the radio access network switches packet transmissions from each terminal to one of the at least two core networks in dependence on the terminals capabilities.

The radio access network may switch packet transmissions from each terminal to one of the at least two core networks in dependence on the terminal type.

The radio access network may switch packet transmissions from each terminal to one of the at least two core networks in dependence on the identity of the cell in which the terminal is connected.

According to the present invention there may also be provided a method of allocating resources in a packet switched mobile network, comprising: allocating at least two core network resources to a location area; associating each mobile user in the location area with one of the core network resources; and switching packet transmissions from mobile users in the location area to the associated one of the core network resources.

The invention will now be described by way of example with reference to the accompanying drawings, in which:

BRIEF DESCRIPTION OF THE DRAWINGS

FIG. 5 illustrates a network architecture in which parallel core network resources of the same functionality are used to support a single location area.

DESCRIPTION OF PREFERRED EMBODIMENT

The present invention will be described hereinafter by way of reference to the particular non-limiting example of the deployment of a $3^{rd}$ Generation (3G) mobile system alongside a $2^{nd}$ Generation (2G) mobile system. In the particular example the 2G system is a GSM/GPRS system, and the 3G system is a UMTS system. The invention, however, is not limited to such a specific environment.

Figure 1:
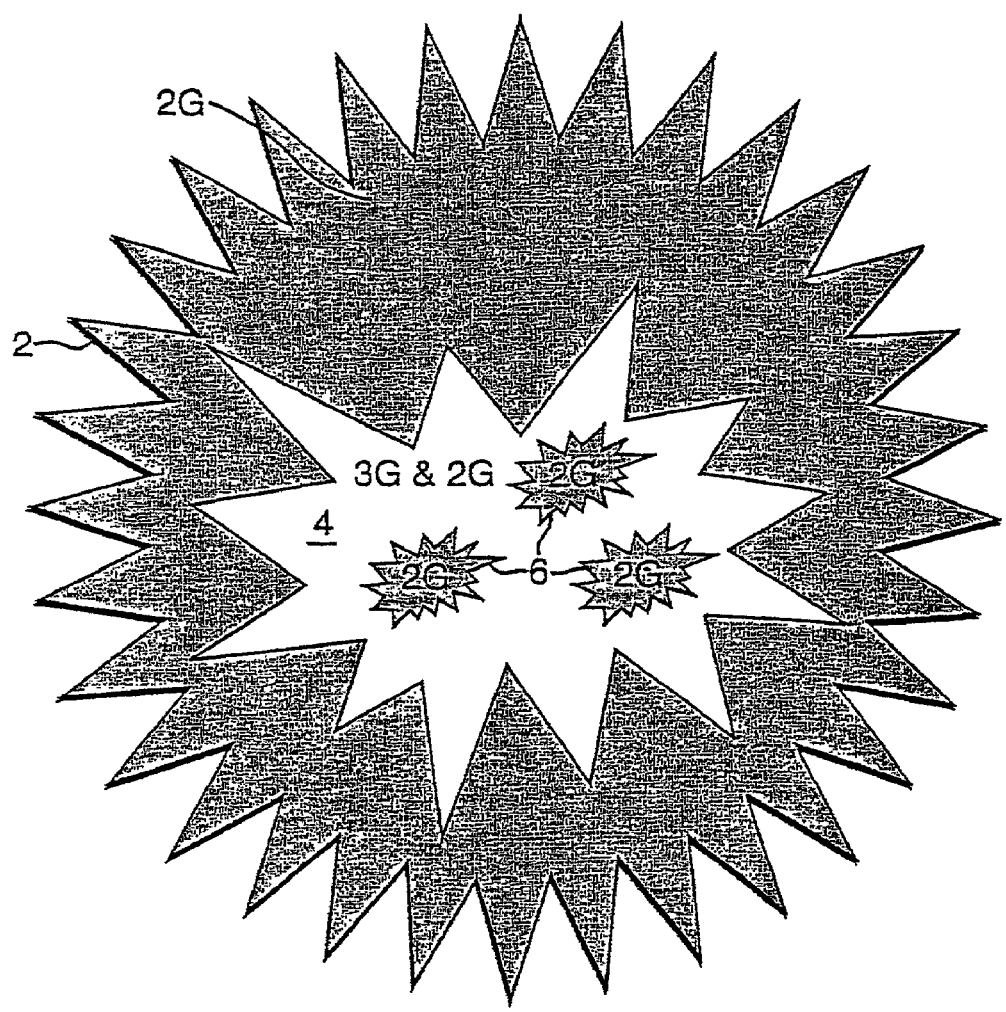
FIG. 1 illustrates the patchy nature of UMTS radio coverage in a GSM coverage area.

FIG. 1 illustrates the coverage expected to be provided by UMTS in a GSM radio access area. The shaded areas represent areas with only GSM coverage. The non-shaded areas represent areas with both GSM and UMTS coverage. Thus the whole of the area 2 is provided with GSM coverage. The smaller area 4 within the area 2 is intended to be provided with UMTS coverage in addition to GSM coverage. However pockets, designated by reference numeral 6, exist within the UMTS coverage area 4, such that only GSM coverage is provided in the pockets 6.

The current proposed network architecture for supporting the radio coverage as illustrated in FIG. 1 is as shown in FIG.

2. The GSM radio access area and the UMTS radio access area are considered as independent systems having distinct location areas, each served by a different serving GPRS support node (SGSN) and a different mobile switching centre (MSC). The SGSNs provide the support node for the respective radio systems to support packet switched communications.

Figure 2:
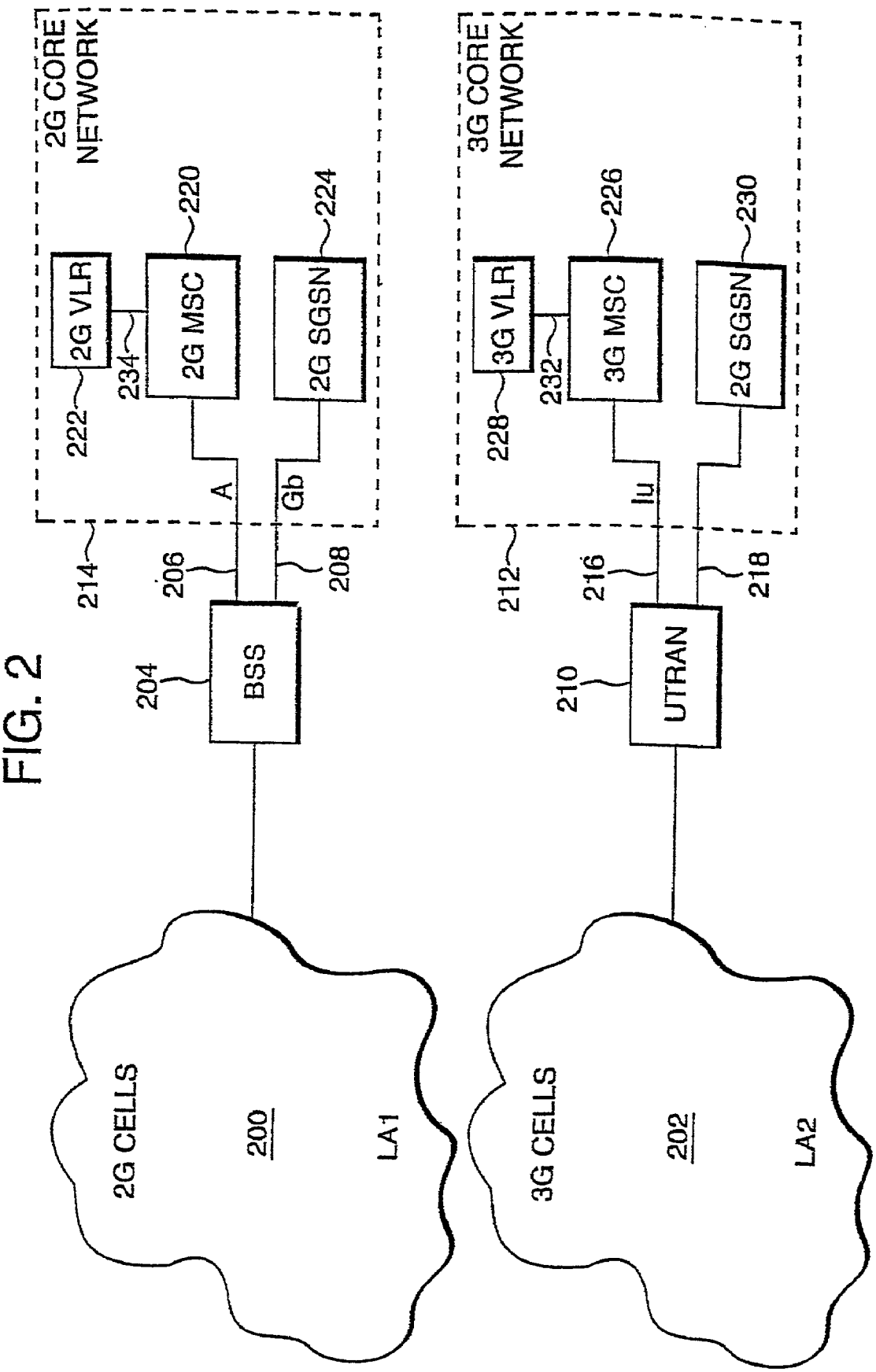
FIG. 2 illustrates a network architecture for the proposed introduction of 3G services in an existing 2G environment.

Referring to FIG. 2, the GSM radio access area is defined by a first location area 200 designated LA1, and the UMTS radio access area is defined by a second location area 202 designated LA2. The second location area in fact coincides with the first location area, as shown in FIG. 1.

The first location area LA1 is associated with a GSM/GPRS BSS 204, providing a radio access network for the GSM/GPRS radio access system. The BSS 204 is connected to a 2G core network 214 via an A interface 206 and a Gb interface 208. The second location area LA2 is associated with a UTRAN 210, providing a radio access network for the UMTS radio access system. The UTRAN 210 is connected to a 3G core network 212 via an Iu interface 216 and an interface 218.

The 2G core network includes a 2G MSC 220, an integral 2G visitor location register (VLR) 222, and a 2G SGSN 224. The 2G MSC is connected to the BSS 204 via the A interface 206. The 2G SGSN is connected to the BSS 204 via the Gb interface 208. The MSC 220 is connected to its integral 2G VLR via a Map B interface 234.

The 3G core network includes a 3G MSC 226, an integral 3G VLR 228, and a 3G SGSN 230. The 3G MSC 226 is connected to the UTRAN 210 via the Iu interface 216. The 3G SGSN 230 is connected to the UTRAN 210 via the interface 218. The 3G MSC 226 is connected to its integral 3G VLR 228 via a Map B interface 232.

Each of the 2G and 3G core networks 214 and 212 will of course contain other functional blocks. However, these are not shown in FIG. 2 as they are not relevant to an implementation of the present invention and will be familiar to one skilled in the art.

As is clear from FIG. 1, the location area LA2 is in fact part of the same geographical area as the location area LA1—if a mobile terminal is in location area LA2 it is also in location area LA1. However, from a network architecture viewpoint the location area 2 is treated as a distinct area from that of the location area 1.

As a mobile moves around within the location area LA2, it will move in and out of 3G coverage, as indicated by the pockets in FIG. 1. In the network architecture of FIG. 2, whenever a mobile terminal moves in and out of 3G coverage in the area LA2 a routing area update must take place, and when 3G coverage is lost a dual mode mobile terminal must continue in 2G mode, with a consequential degradation in service.

One disadvantage with this is that the 2G MSC is implemented using 64 kbit/s technology, whereas the 3G MSC supports much higher bit rates. When a mobile terminal having 3G functionality has to switch from the 3G radio access network to the 2G radio access network then there is a consequential degradation in service. It is of course impractical to upgrade the 2G core network infrastructure to replace existing MSCs with higher specification versions.

Therefore it is necessary to provide the new MSC and integral VLR in the 3G core network to support the 3G functionality of mobile terminals.

In summary, the network architecture of FIG. 2 does not allow the radio access network to be used to its full capacity to support mobile terminals having 3G functionality.

Figure 3:
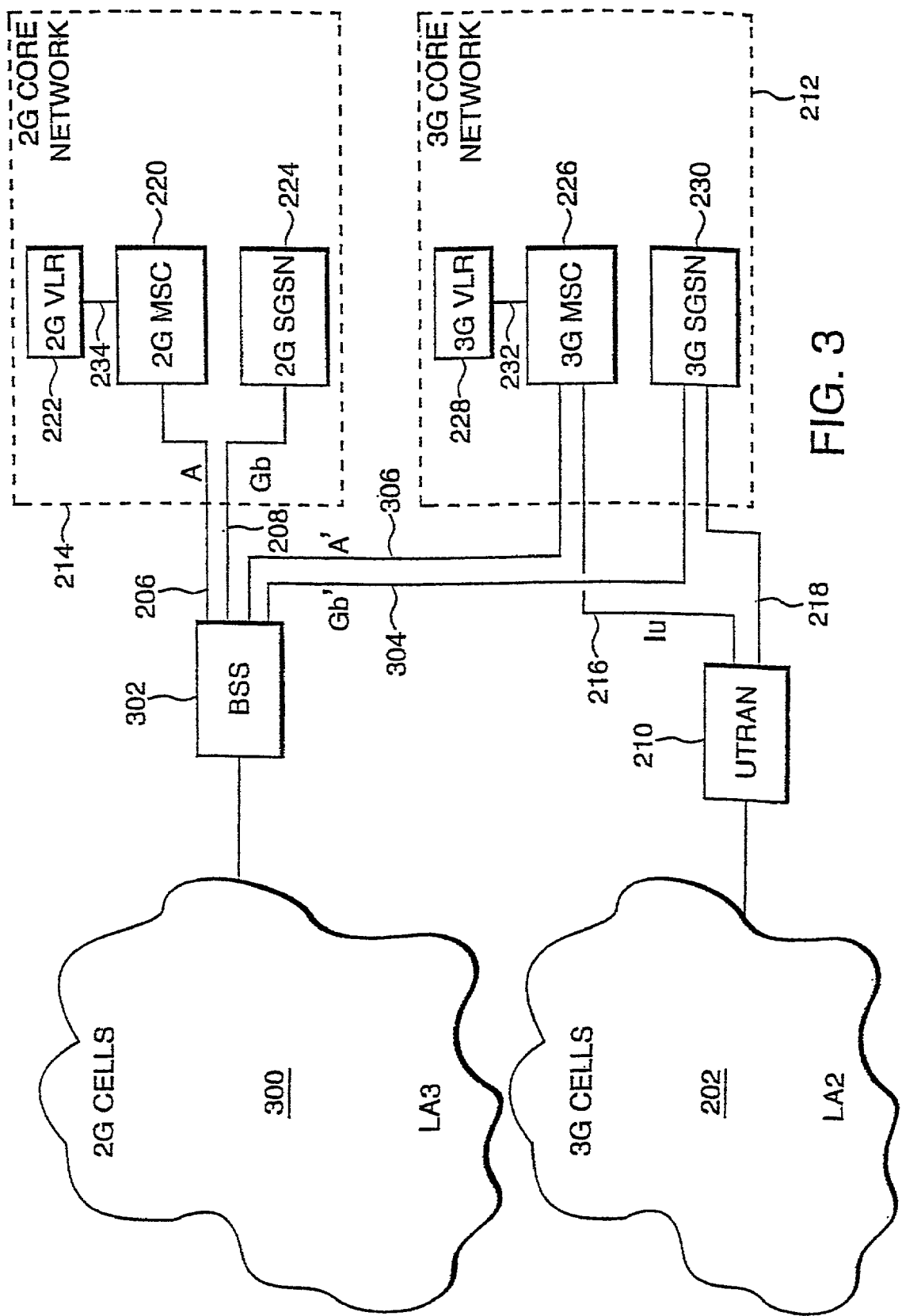
FIG. 3 illustrates a modified network architecture for the proposed introduction of 3G services in an existing 2G environment.

A proposed new network architecture to provide an improved utilisation of the advanced ability of 3G mobile terminals using the existing 2G infrastructure is illustrated in FIG. 3. In FIG. 3 like reference numerals are used to identify elements corresponding to those shown in FIG. 2.

In the network architecture of FIG. 3, the two distinct location areas of FIG. 2 are 'overlayed' to form a common location area. Referring to FIG. 3, the common location area is labelled as LA3 and designated by reference numeral 300. The location area LA2 corresponding to the 3G coverage area is also still distinctly defined. The common location area LA3 is comprised of 2G cells, but the network architecture allows mobile terminals in those cells having 3G functionality to connect to a core network having 3G functionality, as will be discussed further hereinbelow.

The location area LA 2 is comprised of 3G cells as in FIG. 2, and enables the mobile terminals in the location area LA2 having 3G functionality to connect to the 3G core network 212 via the UTRAN 210 radio access network as before.

The 2G BSS 204 of FIG. 2 is modified for the implementation of FIG. 3, and thus the 2G BSS in FIG. 3 is designated by reference numeral 302. The 2G BSS 302 is provided with an additional A interface labelled A' and designated by reference numeral 306, which connects the 2G BSS 302 to the 3G MSC in the 3G core network. The 2G BSS 302 is also provided with an additional Gb interface labelled Gb' and designated by reference numeral 304, which connects the 2G BSS 302 to the 3G SGSN in the 3G core network.

In accordance with the new network architecture of FIG. 3, the BSS 302 directs packet transmissions from mobiles in the combined location area LA3 300 to either the 2G core network or the 3G core network. Similarly, in the other direction the BSS 302 directs packet transmissions from the 2G or 3G core network to mobile terminals in the combined location area LA3.

In accordance with the implementation of the network architecture shown in FIG. 3, the radio access network comprising the BSS 302 switches packet transmissions from the combined location area to one of either the 2G core network or the 3G core network.

The radio access network comprising the BSS 302 may switch the packet transmissions from mobile terminals to a respective one of the two core networks in dependence on a number of factors. For example the packet transmissions may be switched in dependence on the type of mobile terminal from which the packet originated, the capabilities of the mobile from which the packet originated, or the 2G cell in which the mobile terminal is connected in the location area LA3.

Although the radio access network having the switching capability is the preferred implementation of the improved network architecture for implementing the combined location area, other implementations may be possible. For example, the standard BSS 204 of FIG. 2 may be utilised, with the 2G core network being modified to include 3G functionality, and some control mechanisms to select between the 2G and 3G functionality being added within the 2G core network. This implementation is less preferable than the implementation shown in FIG. 3 since it requires modifications to the 2G core network.

The technical feature which enables the 'overlaying' of the location areas LA1 and LA2 to be implemented is the provision of a single radio access network (the BSS 302) which connects the user terminals in the two location areas to both the 2G and 3G functionality in the core network.

In addition, the network architecture of FIG. 3 may be extended to network architectures in which the location areas only partially overlap. That is, in the 2G/3G scenario described hereinabove the 3G location area fits completely into the 2G location area, and the 2G location area is bigger than the 3G location area. That is, the 3G location area fully coincides with the 2G location area. However, the principle of 'overlaying' location areas may extend to location areas which do not exhibit this characteristic.

In addition, the principle of 'overlaying' location areas may extend to more than two location areas, and may extend to more than two core networks. For example, in the future the radio access network provided by the BSS 302 may have the added capability of switching to a $4^{th}$ Generation (4G) core network.

In addition, the provision of this network architecture is not limited to the use of a BSS as the radio access network. The technique readily applies to other radio access networks such as the UTRAN 210. The UTRAN 210 may be provided with a switching functionality in addition to the BSS 302, for example to a 4G core network in addition to the 3G core network. The UTRAN may even provide a switching functionality to switch between the 3G core network 212 and the 2G core network 214.

Although in the network architecture of FIG. 3 the BSS 302 switches between the 2G core network 214 and the 3G core network 212 provided for location area LA2, a separate 3G core network may be provided for this purpose.

The principle of using the radio access network to switch packet transmissions from the location area LA3 to one of two different core networks may also be more generally applicable. In the introduction of 3G, mobile terminals are likely to have dual functionality, i.e. the ability to operate as a 2G terminal instead of a 3G terminal when 3G radio service is not available. By the use of a switchable radio access network, mobile terminals having a 3G functionality which are in 2G location areas may be switched to a 3G core network. Thus the mobile terminals having 3G functionality may utilise some 3G functionality even though they are connected in a 2G location area.

Thus the principle of a radio access network which can switch packet transmissions to core networks of differing functionality does not depend on the overlaying of multiple location areas, and applies more generally in single location areas to mobile terminals having more than one mode of operation.

Referring again to FIG. 3, it can be seen that the location area LA3 300 encompassing the location areas LA1 and LA2 can be considered as a single geographical area by the overlaying of the two location areas. Thus, a single location area identifier may be used to identify the common location area LA3. However, if a common location area identifier were used then the mobile terminals in the common location area 300 would not be able to distinguish between the one of the core networks in which communication is established.

In accordance with a further modification, the location area identifier for the common location are 300 is provided with a core network identifier field to distinguish between the 2G and 3G core networks.

Figure 4:
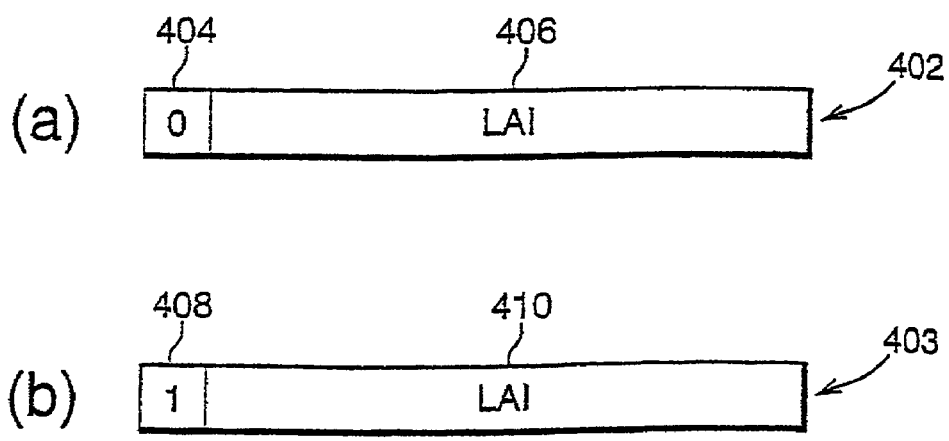
FIGS. 4(a) and 4(b) illustrate location area identifiers for distinguishing between core networks servicing common location areas.

Referring to FIGS. 4(a) and 4(b), there is illustrated an implementation of the location area identifiers transmitted by the 2G and 3G core networks respectively. Preferably the location area identifier is a 16 bit sequence. In accordance with this improvement, the core network identifier field to distinguish between the 2G and 3G core network is the first bit of the 16 bit location area identifier. The first bit of the sequence is set to either 0 or 1 to indicate 2G or 3G. That is, the core network in which the location area identifier originates sets this bit. The remaining 15 bits of the location identifier, containing the location area identifier (LAI) value will be identical. Thus the core network identifier filed of the location area identifier is a pointer to a core network.

Referring to FIG. 4(a), the location area identifier 402 generated by the 2G core network has a first bit 404 which is set to 0, and the location area identity LAI 406. Referring to FIG. 4(b), the location area identifier 403 generated by the 3G core network comprises a first bit which is set to 1, and the location area identifier value LAI 410.

Mobile terminals in the location LA3 may have 2G or 3G functionality. The mobile terminals having 3G functionality can disregard the bit 0 in the first bit position. As these mobiles preferably have dual mode functionality, then all broadcast messages from the radio access network having the appropriate location area identifier are received by these terminals as they receive all broadcast messages whether from the 2G or 3G core network. The mobiles having only 2G functionality read the first bit of the location area identifier and only read the broadcast messages having the bit set to indicate that they originated in the 2G core network.

Of course, if any 3G terminals in the common location area do not have 2G functionality then they will need to read the first bit of the location area identifier to ensure that the bit is set to indicate that the broadcast message originated in the 3G core network.

Although in this preferable example the location area identifier is a 16 bit sequence and the core network identifier field is 1 bit, this may vary according to the implementation. The location area identifier may be any number of bits, and the core network identifier field any number of bits. In an alternative, the core network identifier may be determined by the location area identifier value being within a certain range.

Of course, in the event that more than two core networks are accessible from the location area, an appropriate range of values must be provided by the core network identifier.

The use of the core network identifier is also advantageous in the arrangement described hereinabove where a single location area is accessible by several core networks of different functionality.

A further useful implementation of the radio access network having a switching functionality, as described hereinabove with reference to the preferable implementation of FIG. 3, is described hereinbelow with reference to FIG. 5. In FIG. 5 like reference numerals are used to identify elements corresponding to elements shown in FIG. 2.

Referring to FIG. 5, the 2G network architecture of FIG. 2 is modified to introduce a second 2G core network 514. The radio access network represented by BSS 302 in FIG. 2 is replaced in the network architecture of FIG. 5 by a radio access network comprising a BSS 500 having a switching functionality similar to that of the BSS 302 as will be described further hereinafter.

The second 2G core network 514 includes a 2G MSC 520, an integral 2G VLR 522, and a 2G SGSN 524. The 2G MSC 520 is connected to the BSS 500 via a second A interface 506 labelled A'. The 2G SGSN 524 is connected to the BSS 500 via a second Gb interface 508 labelled Gb'. The MSC 520 is connected to its integral 2G VLR 522 via a Map B interface 534.

In this implementation, the switching capability of the BSS 500 is utilised to spread the load amongst the two 2G core networks 214 and 514. This may be particularly advantageous where the BSS 500 has a greater Erlang capacity than the single core network. By duplicating the core network the BSS 500 can work nearer its capacity.

The technique described above for including a core network identifier field in the location area identifier for distinguishing between 2G and 3G functionality in the network architecture of FIG. 3 may be used in the network architecture of FIG. 5 to distinguish between the respective 2G core networks. Thus a mobile terminal in the location area LA1 can use the first bit of the location area identifier to distinguish between the two core networks 214 and 514, and read the broadcast messages associated with the core network with which it is registered.

More generically, when a mobile terminal registers its presence in the location area LA1 by a random access request to the core network via the BSS 500, the BSS 500 will forward the request to one of the two core networks 214 and 514.

In acknowledging the random access request the appropriate core network will provide the mobile terminal with an identifier to be used in all future packet transmissions. This identifier is then included in all packet transmissions by the mobile terminal, and used by the BSS 500 to direct the packet transmission to the appropriate core network.

The network architecture of FIG. 5 may be combined with the network architecture of FIG. 3, such that each of the 2G and 3G core networks may be provided with parallel duplicate networks for spreading the load.

The invention claimed is:

1. A packet switched network comprising a 2G radio access network, a 2G core network, and a 3G core network, and a location area connected by the 2G radio access network to the 2G core network and the 3G core network; in which the 2G radio access network is operative to switch packet transmissions from each terminal in the location area to one of the core networks dependent on the terminal's capabilities, such that the 2G radio access network connects to the 2G core network terminals that are of a type not capable of connection to a 3G radio access network, and connects to the 3G core network terminals that are of a type capable of connection to a 3G radio access network.

2. The packet switched network architecture of claim 1 in which the radio access network switches packet transmissions from each terminal to one of the core networks in dependence on the identity of the cell in which the terminal is connected.

3. A method of switching packet transmissions in a packet switched network from each terminal in a location area connected by a 2G radio access network to a 2G core network and a 3G core network,
the method comprising the radio access network selecting for packet transmissions from each terminal one of the core networks to switch to dependent on the terminal's capabilities, such that the 2G radio access network connects to the 2G core network terminals that are of a type not capable of connection to a 3G radio access network, and connects to the 3G core network terminals that are of a type capable of connection to a 3G radio access network;
the radio access network switching said packet transmissions for each terminal to the corresponding selected core network.

* * * * *